Patented Sept. 20, 1927.

1,643,032

UNITED STATES PATENT OFFICE.

ROBERT N. RIDDLE, OF GERMANTOWN, PENNSYLVANIA, ASSIGNOR TO RIDDLE PROCESS COMPANY, INC., A CORPORATION OF NEW YORK.

PROCESS OF MAKING A FILTERING MEDIUM.

No Drawing. Application filed June 14, 1923, Serial No. 645,355. Renewed February 12, 1927.

My invention relates to the production of a filtering medium for use in decolorizing sugar syrups and similar purposes and consists of a new form of carbon, derived from soft coal but practically free from ash, and existing as a highly porous, unsintered mass, and the process of making this product.

As an example of the best method at present known to me of carrying out my present invention, I will proceed as follows:

I dissolve 100 grammes of dry carbonate of soda ($Na_2CO_3$) in 270 grammes of hot water and stir into this solution 200 grammes of soft coal pulverized to 100 mesh or finer. Any grade of soft coal will serve, but the better grades of soft coal with high volatile contents give best results. This mixture is boiled with the result of a violent frothing and swelling up of the mass. The final result, after the froth subsides (which usually, occurs in a half hour) is a perfectly liquid, black solution without any residue of sandy lumps or other character.

I may add with the coal 5 grammes of caustic lime which is hydrated before its addition. This improves the quality of the final carbon residue of the entire process in that it leaves less sulphur therein, but it slightly reduces the extent of the nitrogen fixation hereinafter described.

To the liquid solution remaining after the boiling step above described I add 25 grammes of bicarbonate of soda ($NaHCO_3$) which has first been well wet to insure its prompt solution in the liquid. This addition of the wet bicarbonate is preferably done while stirring the mixture of coal and carbonate at a temperature of 95 degrees centigrade. Such heating and stirring should be continued for about ten minutes. The fact that the solution now formed may be boiled without any appreciable evolution of carbonic acid also proves the formation of a chemical compound, or compounds, of the constituents thereof. The liquid formed as above crystallizes rapidly even while hot. The crystalline mass so formed is then allowed to cool, or its cooling hastened in any convenient manner.

The crystals formed as above described are next air-dried at a temperature below any of the fusion points of the alkali constituents, that is to say, below 34 degrees C., which is the fusion point of hydrated sodium carbonate. In practice I find that a current of air at a temperature of 120 degrees F. is best used, as the evaporation of moisture from the material during the drying operation will keep its mass temperature down below the critical point of 34 degrees centigrade. Under these conditions the drying is completed in 2 hours or more.

The above described procedure which I may call the first step of my process has in substance consisted of the formation of crystals containing the carbon and other constituents together with a large volume of water, which water, on evaporation during the drying process, has left the solid materials in a highly porous, uniformly distributed condition. I have found that the carbon and sodium carbonate compounds alone are too stable to easily combine with nitrogen and the purpose of boiling them in aqueous solution with the sodium bicarbonate as above described is to break up or transmit these soda compounds into carbonate compounds which will be less stable and therefore more readily combine with nitrogen. The material produced by this first step of my process can be used directly for the fixation of nitrogen, but the results are vastly improved by subjecting it first to what I may call the second step of my process.

The second step of the process which I will now describe has for its purpose and object the transformation or modification of the volatile hydrocarbon constituents of the original coal complex to a form which can withstand subsequent coking temperatures without destructive distillation. This I find can be accomplished by putting the dry, crystalline mass above described—the result of the first step of my process—into a container so constructed that a very small current of illuminating gas introduced at the bottom will be brought in contact with all particles of the mass before escaping at the top, and maintaining it at a temperature of from 220 to 280 degrees, but not above 290 degrees centigrade for about 6 hours. The greater portion of the desired reactions occur at 240 degrees centigrade. If the materials are agitated this period may be shortened. During this operation a jet of gases having a tar-like odor is discharged, which will burn with a short, clear flame. When this flame turns blue, this step of the process is completed. If the evolved gases are recovered, instead of being burned, the completion of this step of the process can be determined by the cessation of any tar-like odor from the evolved gases and the development of a slight aromatic one. From 2 to 4 grains of a red, resinous distillate may sometimes be recovered from the gases. If heated to a low red, the mass resulting from the above described treatment gives off only carbon monoxide, carbonic oxide, a little vapor and methane, ($CH_4$). It contains at least 80 per cent of the original volatile constituents of the coal.

As the weight of the final mass nearly equals that of the original solids, it follows that nearly all the original carbon complex is still remaining, and as no hydrocarbons can be distilled out of it at low red heat, I believe that the original volatile hydrocarbons have been modified or degraded to a simple carbon complex by the action of low heat in the presence of a reducing gas in this second step of my process, or by combination with the alkalies in the first step in the process, or by conjoint action of both causes.

The next and third step of my process is as follows: The material, treated as above set forth, is, preferably, allowed to cool and transferred to a proper retort adapted to withstanding coking temperatures. This material is still in a fine, pulverulent mass, not sintered nor caked, but in a finely divided condition and not adhesive to the walls of a container even after high heating. It is heated to a temperature of from 650 to 750 degrees centigrade and a stream of nitrogen passed through it. A pressure of 2 inches of water will produce the proper flow of nitrogen through a bed of the material 18 inches deep. Gases are then given off in great volume which consist of hydrogen, methane, and carbon monoxide, forming an inflammable mixture, said gases having been replaced by the nitrogen. A jet of the escaping gases may be burned to indicate the continuance of this reaction and when the flames become weak, usually in about 1 to 1½ hours, the temperature in the retort is slowly raised to about 1000 to 1050 degrees centigrade, renewing the strength of the flame for 15 minutes. This raising of the temperature must be done slowly and any increase beyond 1050 degrees is distinctly injurious. The combustible gases given off in this and in the previous steps of the process may be burned to furnish the heat consumed in said steps.

The solid residue of this nitrogen fixation step is cooled to about 300 degrees centigrade and dry steam passed through it in situ in the retort in the usual way in a quantity which need not be much in excess of the theoretical amount needed to combine with the nitrogen content thereof to form ammonia, and the vapors so produced may be condensed or absorbed in any known way. If condensed they will be found to consist essentially of ammonia, and by redistilling the entire product so obtained the pure ammonia may be isolated. If the products of the steam treatment are passed through sulphuric acid, sulphate of ammonia is produced in the usual way in amount equal to 35 per cent of the original coal used. The evolution of the ammoniacal vapors usually ceases after about 30 to 45 minutes.

The solid residue is then again subjected to the nitrogen fixation treatment for the periods before stated, unless the escaping gases sooner cease to burn, and the treatment with steam is thereafter repeated, realizing about 25 per cent recovery of ammonia, figured as sulphate. Commercially it is not advisable to continue this second treatment beyond the point at which the ammonia will come through in quantity with the steam while the materials are maintained at a temperature of say 550 degrees centigrade. This usually occurs after about half an hour of the second steam treatment.

Thereafter the steam may be passed through the mass at a temperature of from 500 to 600 degrees centigrade (as in the water gas process) to eliminate any sulphur from the residue and otherwise purify it, and without attempting to recover any ammonia therefrom, until such steam is completely free from any characteristic ammoniacal smell, and if the solid residue is then cooled, the alkalies removed by washing with hot water and the lime if any has been employed, dissolved out by hydrochloric acid, a decolorizing carbon is produced as a by-product equal in weight to about 35 to 40 per cent of the original coal used, according to the quality thereof, which, for decolorizing crude sugar syrups and solutions is as good as or better than any other now known to me.

The fact that water in the form of steam is given off to some extent in both the heating steps of the above described process also proves that the chemical combinations of the carbon complexes and the soda constituents have been formed, since all of the original moisture has been removed by drying before these heating steps are begun.

The mixed alkali may be recovered from the residue of the final steam treatment to the extent of about 80 per cent, by weight of the original amounts, and such recovered alkalies can be used over and over again in repetition of the process.

As the alkalies remove from 90 to 98 per cent, of the original ash from the coal, the carbon remaining is practically pure and its ability to decolorize various materials is greatly increased, so that it is more efficient for this purpose than any other form of decolorizing carbon to me.

It should be understood that the proportions of materials used and the time limits of various steps above given may be varied without entirely departing from the principle of my invention or losing the advantages derived from my discovery. The proportions and other specific details above given are merely those which I have so far found to give the best results.

Also other alkaline-metal carbonates may be substituted for sodium carbonate, and certain of the minor ingredients and steps of treatment may be omitted without entirely impairing the results of the process as described.

One purpose and result of the treatment of the carbon-soda mixture, so far as at present understood, is to get the sodium carbonate into the most highly porous condition possible, and to further break up the pulverized coal, whether combined therewith or held in mechanical suspension thereby, into the most minute state of division possible by the disrupting action of the crystallization of the soda. The body of coal, so existing, is in a porous condition and free from tarry desposits, and is exposed to most intimate and complete contact with the nitrogen gas, or with any other gas, which is passed through the mass. The desired chemical combinations by which the non-carbonaceous constituents are ultimately removed are thereby facilitated to the highest degree. The above explanation applies to the mechanical action of the phenomena of rapid crystallization and subsequent evaporation of the water of crystallization. I also believe that there is in the step of heat treatment with nitrogen a degrading of the carbon compounds then existing in the material to pure carbon which results in both mechanically reducing such carbon to the finest possible condition of division, and also in leaving it in a nascent condition. This renders the carbon residue of the process a most effective decolorizing agent because it exposes the greatest possible surface area in a condition most active and efficient for seizing on all impurities dissolved, or entrained, in the fluid being decolorized by passage through such residue.

Drying the alkali and coal crystals below the fusion point of the alkali constituents, as herein before described, is important as it leaves the crystalline particles porous, instead of in the solid fused masses which would result from application of higher temperatures in the drying operation.

Having described my invention, I claim:

1. The process of forming a filtering body which comprises the following steps: forming a dry crystalline mass of an alkali-metal carbonate combined with a uniformly disseminated finely-divided body of soft coal, subjecting said mass to the action of a reducing gas at temperatures below 290 degrees centigrade until the gases evolved burn with a blue flame, and then subjecting the residue to temperatures progressively increasing from 650 to 1050 degrees centigrade in presence of nitrogen gas, and passing dry steam over the coked mass, and washing the solid residue subsequently remaining to remove the alkalies therefrom.

2. The process of forming a filtering body which consists of the following steps: forming a mixture in the proportion of 200 grams of soft coal and 100 grams of carbonate of soda in 270 grams of water and stirring the same at a temperature slightly below boiling point until frothing of the mass ceases, raising the mixture to boiling point and stirring in 25 grams of sodium bicarbonate and continuing boiling until the mass crystallizes; drying the mass at a temperature below that of fusion of hydrated sodium carbonate; heating the crystalline mass to temperatures between 220 and 280 degrees centigrade in the presence of a reducing gas; and, finally, treating with nitrogen at temperatures from 650 to 1050 degrees centigrade, passing dry steam over the coked mass in substantially the theoretical quantity for combining with the nitrogen compounds existing therein, and washing the solid residue subsequently remaining to remove the alkalies therefrom.

3. The process of forming a filtering body of pure carbon in the highest possible degree of subdivision which comprises forming a combination of finely divided soft coal and alkali metal carbonate in hot water, causing the solution to crystallize, drying the crystalline mass and degrading the carbon complexes of the same to pure carbon by forming substitution products of the other constituents of the hydrocarbons with nitrogen, removing said substitution products and washing out the alkali.

ROBERT N. RIDDLE.